US011080197B2

(12) United States Patent
Bretschneider et al.

(10) Patent No.: US 11,080,197 B2
(45) Date of Patent: Aug. 3, 2021

(54) PRE-ALLOCATING CACHE RESOURCES FOR A RANGE OF TRACKS IN ANTICIPATION OF ACCESS REQUESTS TO THE RANGE OF TRACKS

(71) Applicant: INTERNATIONAL BUSINESS MACHINES CORPORATION, Armonk, NY (US)

(72) Inventors: Ronald E. Bretschneider, San Martin, CA (US); Susan K. Candelaria, Tucson, AZ (US); Beth A. Peterson, Tucson, AZ (US); Dale F. Riedy, Poughkeepsie, NY (US); Peter G. Sutton, Lagrangeville, NY (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/653,903

(22) Filed: Oct. 15, 2019

(65) Prior Publication Data

US 2020/0042453 A1 Feb. 6, 2020

Related U.S. Application Data

(63) Continuation of application No. 15/697,440, filed on Sep. 6, 2017, now Pat. No. 10,528,474.

(51) Int. Cl.
*G06F 12/0868* (2016.01)
*G06F 12/0862* (2016.01)
*G06F 3/06* (2006.01)

(52) U.S. Cl.
CPC ...... *G06F 12/0868* (2013.01); *G06F 12/0862* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 5,991,775 A | * | 11/1999 | Beardsley | G06F 12/0866 707/999.205 |
| 6,658,535 B1 | * | 12/2003 | Megiddo | G06F 3/0613 711/112 |

(Continued)

OTHER PUBLICATIONS

U.S. Appl. No. 15/697,440, filed Sep. 6, 2017.

(Continued)

*Primary Examiner* — Sean D Rossiter
(74) *Attorney, Agent, or Firm* — Konrad Raynes Davda & Victor LLP; David W. Victor (57) ABSTRACT

Provided are a computer program product, system, and method for managing access requests from a host to tracks in storage. A cursor is set to point to a track in a range of tracks established for sequential accesses. Cache resources are accessed for the cache for tracks in the range of tracks in advance of processing access requests to the range of tracks. Indication is received of a subset of tracks in the range of tracks for subsequent access transactions and a determination is made whether the cursor points to a track in the subset of tracks. The cursor is set to point to a track in the subset of tracks and cache resources are accessed for tracks in the subset of tracks for anticipation of access transactions to tracks in the subset of tracks.

22 Claims, 7 Drawing Sheets

(56) References Cited

U.S. PATENT DOCUMENTS

| | | |
|---|---|---|
| 8,954,699 B1 | 2/2015 | Chen et al. |
| 9,026,696 B1 | 5/2015 | Natanzon et al. |
| 2004/0260870 A1* | 12/2004 | Factor ................. G06F 11/2069 711/112 |
| 2011/0022818 A1* | 1/2011 | Kegel ................. G06F 12/1009 711/206 |
| 2012/0324171 A1* | 12/2012 | Benhase ............. G06F 12/0866 711/136 |
| 2014/0379990 A1* | 12/2014 | Pan ..................... G06F 12/0868 711/135 |
| 2016/0320988 A1 | 11/2016 | Bish et al. |
| 2016/0378368 A1 | 12/2016 | Ash et al. |
| 2016/0378369 A1 | 12/2016 | Ash et al. |
| 2017/0344276 A1* | 11/2017 | Sutardja ................ G06F 3/0676 |
| 2019/0073310 A1 | 3/2019 | Bretschneider et al. |

OTHER PUBLICATIONS

Office Action dated Mar. 19, 2019, pp. 11 for U.S. Appl. No. 15/697,440.

Response dated Jun. 19, 2019, pp. 13, to Office Action dated Mar. 19, 2019, pp. 11 for U.S. Appl. No. 15/697,440.

Notice of Allowance dated Aug. 26, 2019, pp. 9, for U.S. Appl. No. 15/697,440.

List of IBM Patents or Patent Applications Treated as Related, pp. 2, Oct. 15, 2019.

\* cited by examiner

FIG. 1

Establish Write Access Request

FIG. 2

Establish Write Access Entry

FIG. 3

Track Access List Entry

FIG. 4

Write Request

PRE-ALLOCATING CACHE RESOURCES FOR A RANGE OF TRACKS IN ANTICIPATION OF ACCESS REQUESTS TO THE RANGE OF TRACKS

BACKGROUND OF THE INVENTION

1. Field of the Invention

The present invention relates to a computer program product, system, and method for pre-allocating cache resources for a range of tracks in anticipation of access requests to the range of tracks.

2. Description of the Related Art

In a storage environment, a host system may communicate a read/write request to a connected storage system over network channel through a network adaptor. For write requests, cache resources need to be allocated to a target track of a write request to process the write request. This allocation of cache resources increases the latency in completing processing of the write request. Further, a thread or task sending the host write request may have to be context switched and deactivated in order to allow the host system to process further requests. When the write complete is returned, then the task that initiated the write must be reactivated to process the completion of the write request.

There is a need in the art for improved techniques for processing host read/write requests to the cache.

SUMMARY

A first embodiment comprises a computer program product, system, and method for managing access requests from a host to tracks in storage. A cursor is set to point to a track in a range of tracks established for sequential accesses. Cache resources are accessed for the cache for tracks in the range of tracks in advance of processing access requests to the range of tracks. Indication is received of a subset of tracks in the range of tracks for subsequent access transactions and a determination is made whether the cursor points to a track in the subset of tracks. The cursor is set to point to a track in the subset of tracks and cache resources are accessed for tracks in the subset of tracks for anticipation of access transactions to tracks in the subset of tracks.

With the first embodiment, cache resources are initially accessed in advance of receiving access requests for tracks in a range of tracks, so when the access requests are received, the cache resources will already have been accessed and allocated, thus reducing the latency of processing the access requests. Further, indication may be received of a subset of tracks in the range tracks to provide a more specific range within the range of tracks for which access requests are anticipated. The cache resources may then be allocated for this subset of tracks to optimize the processing of the access requests expected for this subset. This allows tailoring and pinpointing of the prefetching of cache resources for a specific subset of tracks in the range for which the immediate access requests will be directed.

In a second embodiment, the first embodiment may additionally comprise releasing cache resources held for tracks preceding the cursor in the range of tracks after setting the cursor set to point to a track in the subset of tracks and accessing cache resources for consecutive tracks from the cursor for which cache resources are not held.

With the second embodiment, cache resources held for tracks preceding the cursor are released because the cursor is positioned at a track for which the sequential accesses are expected, so resources may be released for tracks prior to the cursor because access requests are not expected prior to the cursor. Further, cache resources may be accessed following the cursor to be available for the expected access requests for tracks following the cursor position. This optimizes the pre-allocation of cache resources for access requests that are likely to occur.

In a third embodiment, the first embodiment may additionally comprise that the access transactions comprise write transactions. Write transactions to a target track are processed in response to determining that the cursor points to a track in the subset of tracks. In response to completing the write transaction, the cursor is set to point to a next track in the range of tracks following the target track pointed to by the cursor that was not written, the cache resources held for the target track are released, and cache resources are accessed for a track following the cursor in the range of tracks for which cache resources are not held and that has not been written since the range of tracks was established.

With the third embodiment involving write transactions, write transactions are processed when the cursor points to a track in a subset of tracks being processed because the cache resources for that received write transaction would have been accessed for tracks within the subset of tracks because the cursor is within that subset. Thus the write transactions can be processed because the cursor from which cache resources have been accessed is in the subset of tracks for which write transactions are being received.

In a fourth embodiment, the third embodiment may additionally comprise providing a track access list indicating for each track in the range of tracks whether cache resources are held for the track and whether the track was written since the range of tracks was established. The setting the cursor to point to the next track comprises determining from the track access list whether there are one or more consecutive tracks following the target track to which the cursor points that are indicated in the track access list as having been written, setting the cursor to point to a next track immediately following the cursor in response to determining that there are not one or more consecutive tracks following the cursor that have been written, and setting the cursor to point to a track following a last of the determined one or more consecutive tracks in response to determining that there are one or more consecutive tracks following the cursor having been written.

With the fourth embodiment, if writes occur out of order within the range of tracks, then consecutive tracks following the cursor may already have been written. In such case, the fourth embodiment, moves the cursor past consecutive tracks that were already written following the track pointed to by the cursor because future write requests will not occur to those tracks already written. In this way, moving the cursor beyond consecutive tracks written allows the cursor to accurately reflect a point from which future write transactions will be received by avoiding pointing to tracks that already have been written.

A fifth embodiment comprises a computer program product, system, and method for managing write requests from a host to tracks in storage. A cursor is set to point to a track in a range of tracks established for write transactions to sequential tracks. Cache resources are accessed for the cache for tracks in the range of tracks in advance of processing access requests to the range of tracks. A write transaction is received on a first channel from the host indicating a subset of tracks in the range of tracks. The write transaction is failed in response to determining that the cursor does not point to a track in the subset of tracks. The write transaction is received on a second channel connected to the host in response to the failing the write transaction and the write transaction to a target track is processed in response to receiving the write transaction on the second channel.

With the fifth embodiment, if a write is received on a first channel that requires fast or low latency processing of write requests, and the cursor does not point to a track in the range of tracks established for the expected sequential write transactions, then the cache resources would not have been accessed and the request is failed because the low latency requirement for the first channel cannot be met when the cache resources have not been allocated when the write transaction is received. After failing the write transaction on the low latency first channel, the request is received on a second channel that does not have the low latency requirements, and the write transaction is then processed without requiring the cache resources to be pre-allocated because there is no low latency processing requirement for the second channel.

In a sixth embodiment, the fifth embodiment may additionally comprise processing the write transaction received on the first channel in response to determining that the cursor points to a track in the subset of tracks and moving the cursor to point to a next track in the range of tracks, consecutive with respect to a current position of the cursor, that has not yet been written in response to completing the write transaction on the first or second channel.

With the sixth embodiment, the write transactions received on the low latency first channel are processed if the cursor does point to a track in the subset of tracks for which the write transaction is received, because the presence of the cursor in this subset indicates that cache resources would have been pre-allocated for the subset of tracks for which the write transaction is received, and be available to provide for low latency processing of the write transaction. The cursor may then be moved to point to a track following the track currently pointed to that was not written, so that cache resources can be continually accessed for sequential tracks within the range of tracks not yet written and for which further sequential write accesses are expected. In this way, cache resources will be available for the sequential writes received following the cursor to allow for low latency processing of the sequential writes.

In a seventh embodiment, the fifth embodiment may additionally comprise that in response to completing the write transaction on the first or second channel, the cache resources held for the target track are released and cache resources are accessed for a track within the range of tracks following a last track in the range of tracks for which cache resources were accessed.

With the seventh embodiment, when completing a write, the cache resources held for that completed write are released because there will be no further expected writes to that track already written and cache resources are accessed for a next track not written in the range of tracks to which future write transactions are expected. In this way, cache resources are continually being prefetched for write transactions expected in the range to be available when the write transaction is received to allow for low latency processing of future write transaction with the pre-allocated cache resources.

DETAILED DESCRIPTION

In a storage environment, a host system may first communicate a read/write request to a connected storage system over a fast channel, such as a bus interface, such as the Peripheral Component Interconnect Express (PCIe) interface. For a read/write request over the fast channel which is supposed to complete within a threshold time, the host system holds the application thread for the read/write request in a spin loop waiting for the request to complete. This saves processor time associated with a context swap, which deactivates the thread and reactivates the thread in response to an interrupt when a response to the read/write request is received. If the data for the read/write request sent on the fast channel is not in cache, then the storage system may fail the read/write request and the host system may communicate the same read/write request over a storage area network via a host adaptor, which is slower than processing the I/O request over the bus, e.g., PCIe interface. Communicating the read/write request over the second channel requires the host system to perform a context switch from the task handling the read/write request to another task while waiting for the read/write request to complete. Context switching is costly because it requires the processor running the task to clear all registers and L1 and L2 caches for the new task, and then when completing the new task, reactivate the context switched task and return the state data to the registers and L1 and L2 caches for the task that was context switched while waiting for the read/write request to complete.

Certain read/write operations need to be completed within a threshold time, else they are failed. To process a read or write request, the storage system will have to allocate cache resources, including resources and segments in cache storage and a non-volatile storage if one is used, and access track metadata to process the read or write request. The track metadata provides information on the format of data and layout of records in the track that are needed in order to perform reads and writes to the track. However, the allocation of cache resources, including accessing of metadata, from the storage comprises a substantial portion of the latency in processing read/write requests.

Described embodiments provide improvements to cache technology that reduce cache operation latency by accessing cache resources in anticipation of subsequent access requests, such as read or write requests, that will occur to the tracks. In response to establishing a range of tracks for sequential accesses, cache resources for a subset of tracks in the range of tracks are accessed. Upon processing an access request to a target track in the range of tracks, the cache resources for the target track are released and the cache resources are accessed for a track within the range of tracks following a last track in the range of tracks for which cache resources were accessed.

By accessing the cache resources in advance of the access request, latency in processing the access request is minimized. Further, by accessing cache resources in advance of the access request, described embodiments increase the likelihood that read/write requests sent by the host on a first fast channel are completed within a required threshold time for processing access requests on the first channel requiring fast processing. This keeps the time the host thread is spinning on the read/write request task for the read/write request sent on the bus interface within an acceptable time threshold. However, if the cache resources for a requested target track have not been allocated in advance of the request, then the read/write request on the first channel may be failed because it is unlikely the read/write request can complete within the threshold time given that the cache resources will have to be allocated. Failing the read/write request on the first channel, causes the host to redrive the read/write request on the second channel. The processing of the read/write request on the second channel allocates the required cache resources when processing the access request.

Figure 1:
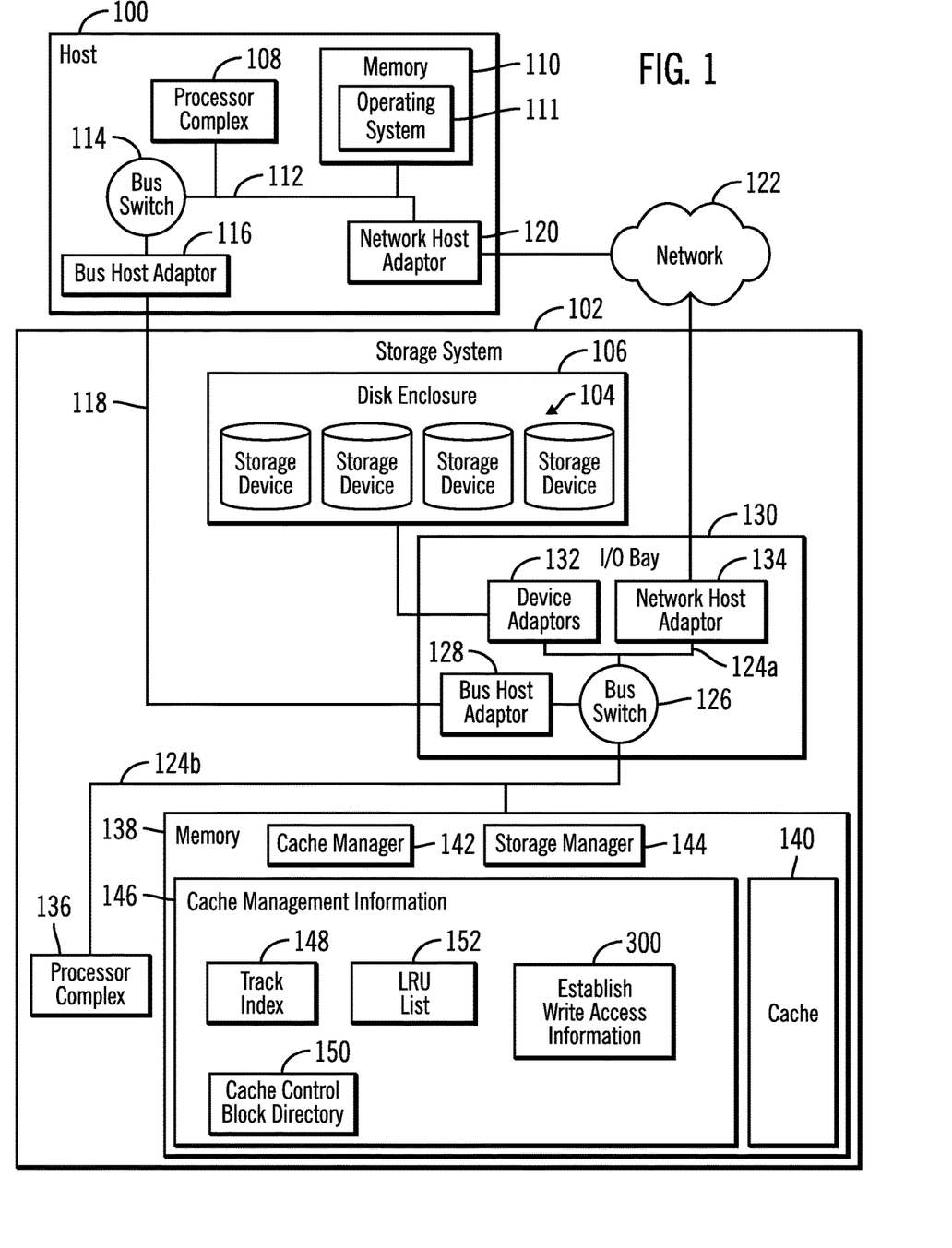
FIG. 1 illustrates an embodiment of a storage environment.

FIG. 1 illustrates an embodiment of a storage environment in which a host 100 directs read and write requests to a storage system 102 to access tracks in volumes configured in storage devices 104 in a disk enclosure 106. The host 100 includes a processor complex 108 of one or more processor devices and a memory 110 including an operating system 111 executed by the processor complex 108. The host operating system 111 generates read and write requests to tracks configured in the storage devices 104. The host 100 includes hardware to communicate read and write requests on two different channels. A first channel is a bus interface, such as a Peripheral Component Interconnect Express (PCIe), including a bus 112, a bus switch 114 to connect one or more devices on the bus 112, including the processor complex 108, a memory system 110, and a bus host adaptor 116 to extend the bus interface over an external bus interface cable 118 to the storage system 102. Additional bus interface technology to extend the bus interface may be utilized, including PCIe extender cables or components, such as a distributed PCIe switch, to allow PCIe over Ethernet, such as with the ExpEther technology. A second channel to connect the host 100 and storage system 102 uses a network host adaptor 120, connected to the bus 112, that connects to a separate network 122 over which the host 100 and storage system 102 additionally communicate. The first channel through the bus interface may comprise a faster access channel than the network 122 interface through the network host adaptor 120.

The storage system 102 includes a bus interface comprising a bus 124a, 124b, a bus switch 126 to connect to endpoint devices on the bus 124a, 124b, and a bus host adaptor 128 to connect to the external bus interface cable 118 to allow communication over the bus interface to the host 100 over the first channel. The storage system 102 includes an Input/Output bay 130 having the bus host adaptor 128, one or more device adaptors 132 to connect to the storage devices 104, and one or more network host adaptors 134 to connect to the network 122 and host systems.

The storage system 102 includes a processor complex 136 of one or more processor devices and a memory 138 having a cache 140 to cache tracks accessed by the connected hosts 100. The memory 138 includes a cache manager 142 and a storage manager 144. The storage manager 144 manages access requests from processes in the hosts 100 and storage system 102 for tracks in the storage 104. The devices 136, 138, 128, 132, and 134 connect over the bus interface implemented in the bus lanes 124a, 124b and bus switch 126.

The cache manager 142 maintains accessed tracks in the cache 140 for future read access to the tracks to allow the accessed tracks to be returned from the faster access cache 140 instead of having to retrieve from the storage 104. Further, tracks in the cache 140 may be updated by writes. A track may comprise any unit of data configured in the storage 104, such as a track, Logical Block Address (LBA), etc., which is part of a larger grouping of tracks, such as a volume, logical device, etc.

The cache manager 142 maintains cache management information 146 in the memory 138 to manage read (unmodified) and write (modified) tracks in the cache 140. The cache management information 146 may include a track index 148 providing an index of tracks in the cache 140 to cache control blocks in a control block directory 150; and a Least Recently Used (LRU) list 152 for tracks in the cache 140. The control block directory 150 includes the cache control blocks, where there is one cache control block for each track in the cache 140 providing metadata on the track in the cache 140. The track index 148 associates tracks with the cache control blocks providing information on the tracks in the cache 140. Upon determining that the cache LRU list 152 is full or has reached a threshold level, tracks are demoted from the LRU list 152 to make room for more tracks to stage into the cache 140 from the storage 104.

The cache management information 146 may further includes establish write access information 300 for establish write access requests submitted by the host 100 to start prefetching cache resources for a range of tracks in advance of receiving write transactions for the read request. The host 100 may submit multiple establish write access requests to establish multiple ranges of tracks for which track resources will be allocated in anticipation of multiple streams of sequential write transactions toward the different ranges of tracks.

In certain embodiments, there may be multiple hosts 100 that connect to the storage system 102 over the first and second channels to access tracks in the storage devices 104. In such case, the storage system 102 would have at least one bus host adaptor 128 to connect to the bus interface 118 of each connected host 100 and one or more network host adaptors 134 to connect to the network host adaptors 120 on the hosts 100.

In one embodiment, the bus interfaces 112, 114, 116, 118, 124a, 124b, 126, and 128 may comprise a Peripheral Component Interconnect Express (PCIe) bus interface technology. In alternative embodiments, the bus interfaces 112, 114, 116, 118, 124a, 124b, 126, and 128 may utilize suitable bus interface technology other than PCIe. The bus host adaptors 116 and 128 may comprise PCIe host adaptors that provide the interface to connect to the PCIe cable 118. The network 122 may comprise a Storage Area Network (SAN), a Local Area Network (LAN), a Wide Area Network (WAN), the Internet, an Intranet, etc., and the network host adaptors 120, 134 provide the network 122 connections between the hosts 100 and storage system 102.

The storage system 102 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 104 in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 104 in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

Figure 2:
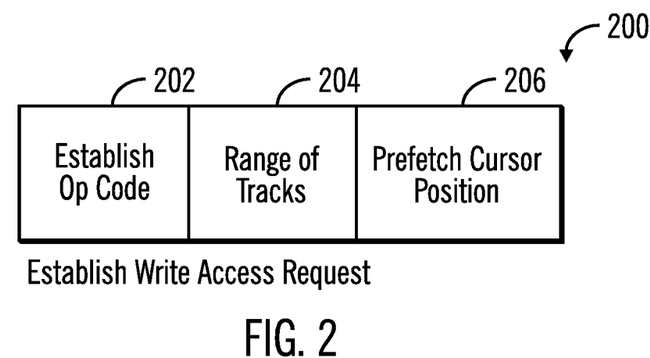
FIG. 2 illustrates an embodiment of an establish write access request.

FIG. 2 illustrates an embodiment of an establish write access request 200 received before receiving sequential write transactions including an establish operation code 202 indicating the establish write access request; a range of tracks 204 to which sequential write transactions are anticipated to be directed and for which cache resources should be accessed in advance of the sequential write transactions; and a prefetch cursor position 206 indicating where in the range of tracks 204 a prefetch cursor should point, which may comprise the point in the range of tracks 204 at which the first sequential write transactions are anticipated to occur.

Figure 3:
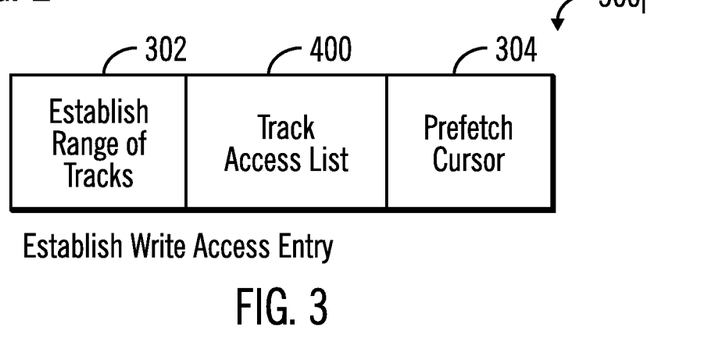
FIG. 3 illustrates an embodiment of an establish write access entry for an establish write request.

FIG. $300_i$ illustrates an embodiment of an instance $300_i$ or entry in the establish write access information 300 created for an establish write access request 200 that includes the establish range of tracks 302 specified in field 204 of the establish write access request 200; a track access list 400 indicating for each track in the range of tracks 302 whether the cache resources are being held for the track and whether the track was written since receiving the establish write access request 200; and a prefetch cursor 304 indicating a track in the range of tracks 302. The prefetch cursor 304 is set to a track from which cache resources should be pre-allocated for executed sequential write transactions.

Figure 4:
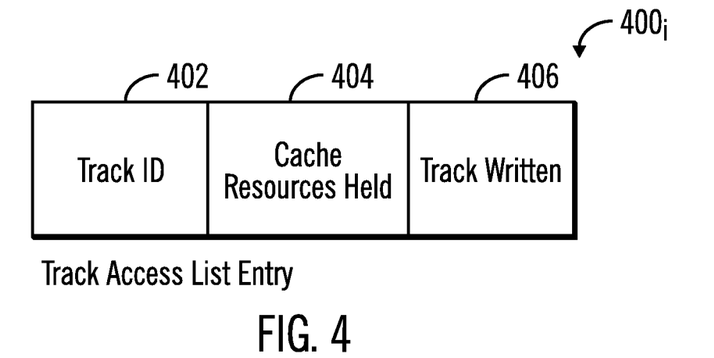
FIG. 4 illustrates an embodiment of a track access list entry in a track access list.

FIG. 4 illustrates an embodiment of a track access list entry $400_i$ in the track access list 400 indicating for a track identifier (ID) 402 a cache resources held flag 404 indicating whether cache resources are being held for the track 402 and a track written flag 406 indicating whether the track was written 406 since the establish write access request 200.

Figure 5:
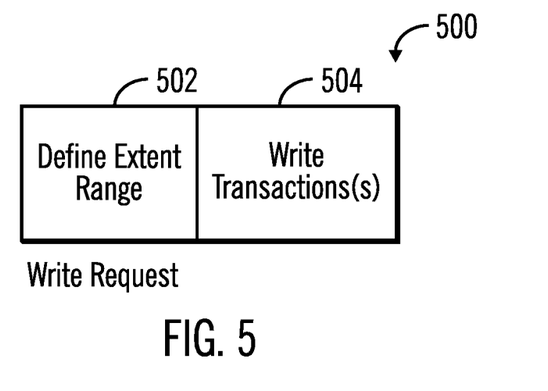
FIG. 5 illustrates an embodiment of a write request.

FIG. 5 illustrates an embodiment of a write request 500 received for an establish write access request 200, including a define extent range 502 indicating a subset of tracks within the establish range of tracks 302 to which the following one or more sequential write transactions 504 will be directed.

The host operating system 111 may generate the establish write access request 200 for a range of tracks 202 in advance of sending write requests 500 for sequential write transactions 504 so that the cache resources for the sequential write transactions are allocated in the storage system 102 in advance of the host operating system 111 sending write requests 500 of sequential write transactions to reduce latency of processing the write transactions, and allow for fast acknowledgment of completion to the host 100.

In embodiments where the host operating system 111 comprises Z Systems Operating System (Z/OS®), or other similar operating system, the write request 500 may further include a locate record domain that that specifies the subset of tracks in the define extent range 502 subject to the write transactions 504. In such Z/OS implementations, the define extent 502, locate record domain and write transactions 504 may be packaged into a Prefix Command.

Figure 6:
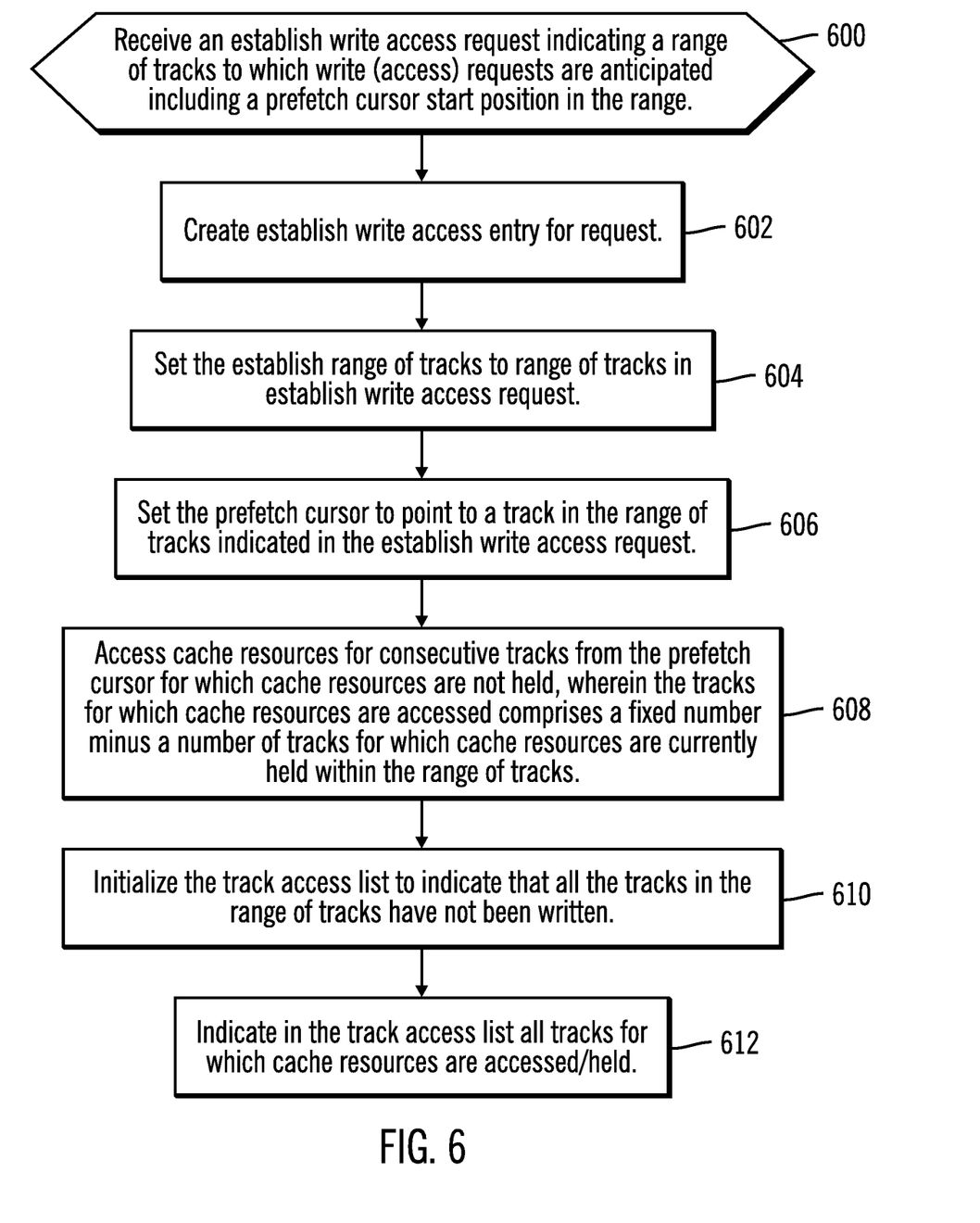
FIG. 6 illustrates an embodiment of operations to process an establish write access request.

FIG. 6 illustrates an embodiment of operations performed by the cache manager 142 and/or storage manager 144, or other component, to process an establish write access request 200 sent by the host operating system 111 to allocate cache 140 resources for write requests to be subsequently received toward the range of tracks 204 requests, such as read requests) is reduced by allocating the cache resources before the write request is received. Upon receiving (at block 600) an establish write access request 200 indicating a range of tracks 204 to subject to prefetching of cache resources and a prefetch cursor position 206, the cache manager 142 creates (at block 602) an establish write access entry $300_i$ for the establish write access request 200 and sets (at block 604) the establish range of tracks 302 to the range of tracks 204 in the establish write access request 200 and sets (at block 606) the prefetch cursor 304 to point to a track in the range of tracks 204 identified by the prefetch cursor position 206.

The cache manager 142 accesses (at block 608) cache resources for consecutive tracks from the prefetch cursor 304 for which cache resources are not being held. In an embodiment where cache resources can only be held for a fixed number of tracks for one establish write access request 200, cache resources are accessed for a number of tracks equal to the fixed number minus a number of tracks within the range of tracks 302 for which cache resources are already held. The track access list 400 is initialized (at block 610) to indicate in field 406 that all tracks in the range of tracks 204 have not yet been written (or accessed, e.g., read). The track access list 400 is further updated (at block 612) to indicate that cache resources are held in field 404 for all tracks in the range 302 for which cache resources are held/accessed.

With the operations of FIG. 6, the cache manager 142 pre-allocates cache resources for the establish write access request 200 for as many tracks within the range of tracks as permitted in anticipation of the sequential write transactions that will likely soon be directed to those tracks indicated in the range of tracks 204, which the host operating system 111 sends in advance of sequential write operations. These pre-allocated cache resources reduce the latency of processing the sequential write requests when they are eventually received. Further, by allocating cache resources for a limited (fixed number) of a first subset of tracks within the range of tracks 204, cache resources are held for only those tracks most likely to be written too first as part of a sequential write stream following the establish write access request 200. Further, the number of tracks for which cache resources are held is limited to allow those tracks to be available for access by other processes in the host operating system 111 or other connected hosts 100.

With the embodiments of FIG. 6, the cache manager 142 continues to hold cache resources for tracks within the range of tracks 302 in anticipation that they will be needed for sequential writes to those tracks. Continuing to hold cache resources for tracks being held prior to the establish write access request 200 reduces latency in processing the write requests that will eventually likely be directed to these tracks, and avoids the need to prefetch the cache resources again for these tracks.

A cache resource that is held and accessed for tracks in the range of tracks 302 may comprise a segment in cache 140 to use for the track to write, a segment in a non-volatile storage if a copy of write tracks is to be stored in a non-volatile storage in a same or different cluster, track metadata for the track, as well as other types of cache resources needed to process a write transaction toward the track.

Figure 7A:
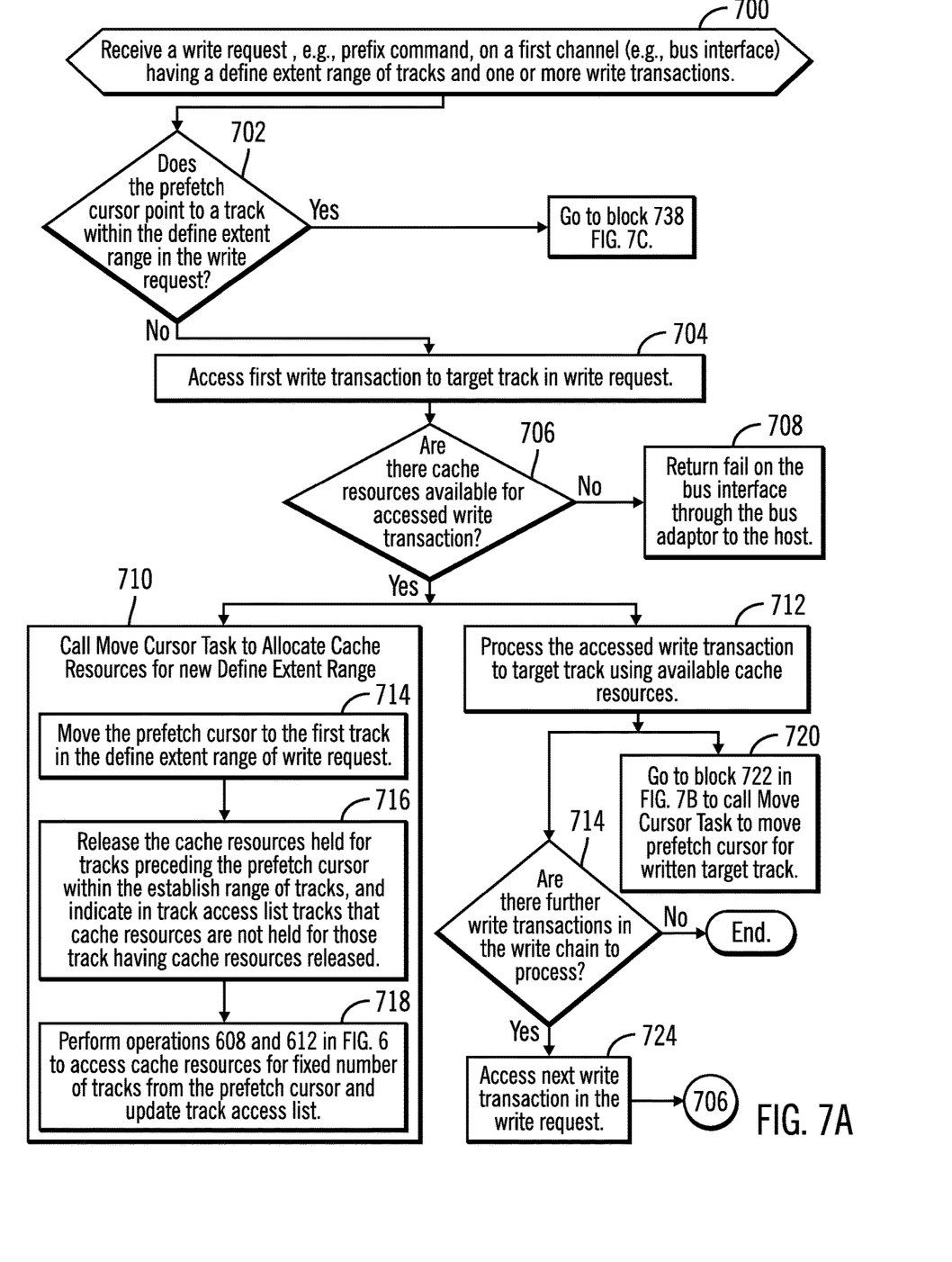
FIGS. 7a, 7b, and 7c illustrate an embodiment of operations to process a write request received on a first fast access channel.
Figure 7B:
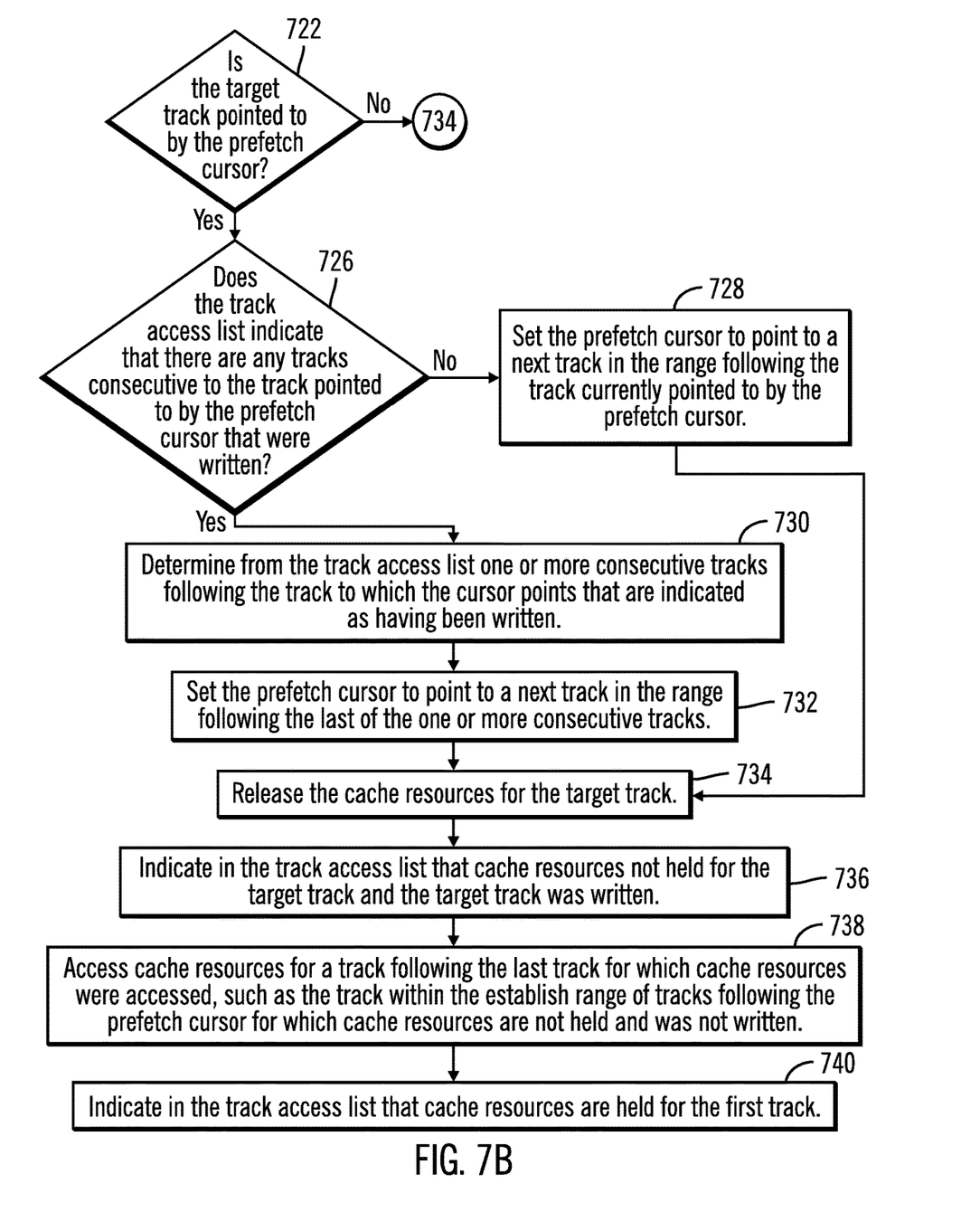
Figure 7C:
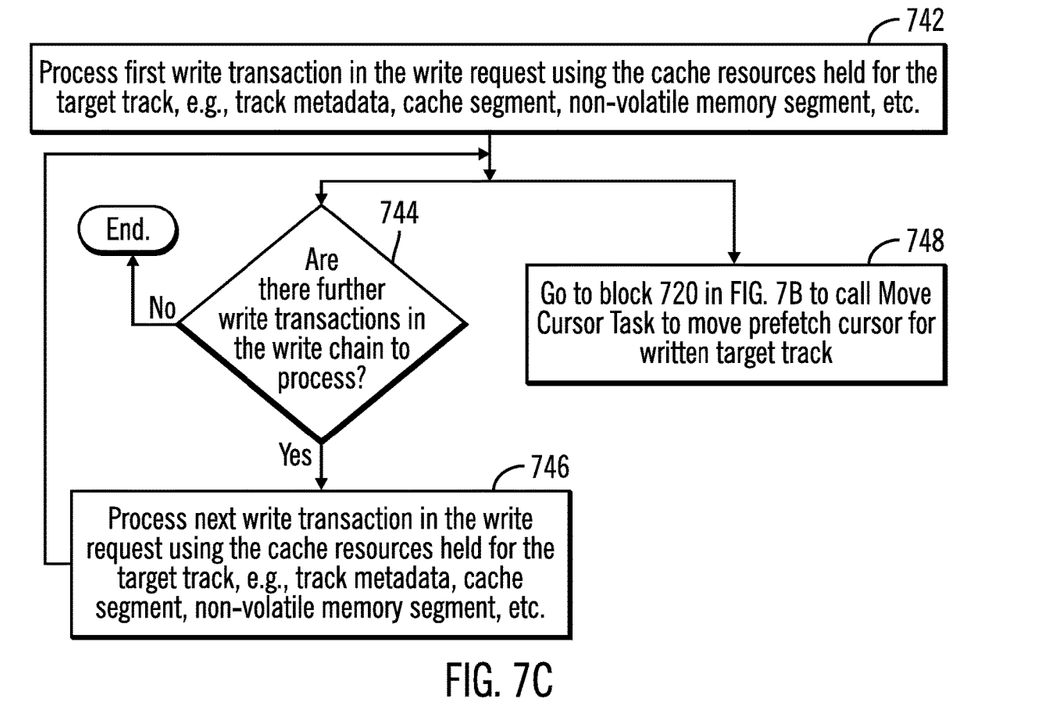

FIGS. 7a, 7b, 7c illustrates an embodiment of operations performed by the storage manager 144 and/or cache manager 142, or other component, to process a write request 500 to a target track in the range of tracks 302 for an establish write access entry $300_i$, received on a fast access channel, such as the bus interface via bust host adaptor 128. Upon receiving (at block 700) a write request 500 on the first fast channel, e.g., on bus host adaptor 128, the cache manager 142 determines (at block 702) whether the prefetch cursor 304 points to a track within the define extent range 502 of the write request 500. Cache resources have been allocated from the track pointed to by the prefetch cursor 304. Thus, if the write request 500 is for a range 502 different from the range for which cache resources have recently been accessed, then cache resources may not have been allocated in advance for the received write transactions 504. If (at block 702) the prefetch cursor does not point to a track in the define extent range 502, i.e., cache resources are unlikely to have been pre-allocated, then the cache manager 142 accesses (at block 704) a first write transaction 504 to a target track in the write request 500. If (at block 706) there are no cache resources available for the accessed write transaction 504, fail is returned (at block 708) to the write request on the first channel or bus host adaptor 128 to the host 100, which causes the host 100 to retry the read/write request on the second channel or network host adaptor 120, 134. Failure is returned because if the cache resources have not been allocated, then the latency delays to allocate the necessary cache resources to process the write request would likely exceed the time threshold latency for completing a request on the first channel, where the host processor is spinning on the thread of the read/write request.

If (at block 706) the cache resources are available to process the write transaction, then the cache manager 142 may perform operations at block 710 and 712 in parallel to process the write transaction. At block 710, the cache manager 142 calls a move cursor task to allocate cache resources for the new define extent range 502 in the write request 500. As part of this task, the prefetch cursor 304 is moved (at block 714) to the first track in the new define extent range 502 of the write request 500. The cache resources held for tracks preceding the prefetch cursor 304 within the establish range of tracks 302 are released (at block 716) and indication is made in in the track access list 400 that cache resources are not held 404 for the tracks having their cache resources released. The cache manager 142 may perform (at block 718) the operations at block 608 to access cache resources for a fixed number of tracks from the prefetch cursor 304 set to within the define extent range 502 and indicate in field 404 of the accessed tracks 402 of the track access list 400 that cache resources are held for these tracks.

At block 712, performed in parallel with calling the move cursor task 710, the cache manager 142 processes the accessed write transaction to the target track using the available cache resources. After processing the write transaction, the cache manager 142 in parallel proceeds to block 714 to access a next write transaction if one available in the write request 500 and proceeds (at block 720) to block 722 in FIG. 7b to call the move cursor task to move the prefetch cursor for the one track written. If (at block 714) there are further write transactions, then the next write transaction 504 in the write request 500 is accessed (at block 724) and control proceeds back to block 706 to process the next write transaction. If there are no further write transactions, then control ends.

With the operations of FIG. 7a, write transactions are always immediately processed because tracks are being processed on the fast first channel, and the operations to move the prefetch cursor 304 and release and access new cache resources are performed in the background by another task that does not impede performance of write transaction processing. In alternative embodiments, the background tasks to move the prefetch cursor 304 and release and access cache resources may be performed after processing all the write transactions.

FIG. 7b illustrates the embodiment of operations performed to move the prefetch cursor 304 when completing processing one write transaction and release and access cache resources. At block 722 in FIG. 7b, if the target track is pointed to by the prefetch cursor 304, then to adjust the prefetch cursor 304, a determination is made as to whether the track access list 400 indicates that there are any tracks consecutive to the track pointed to by the prefetch cursor 304 that were written, e.g., the track written flag 406 indicates the track was written. If (at block 726) the there are no consecutive tracks that were written following the prefetch cursor 304 track, then the prefetch cursor 304 is set (at block 728) to point to a next track in the range following the track pointed to by the prefetch cursor 304. If (at block 726) there are consecutive tracks that were written, then a determination is made (at block 730) from the track access list 400 of the one or more consecutive tracks that were written following the track pointed to by the prefetch cursor 304 and the prefetch cursor 304 is set (at block 732) to a next track following the last of the one or more consecutive tracks following the prefetch cursor 304.

After adjusting the prefetch cursor 304 at block 728 or 732, the cache resources for the target track just written are released (at block 734) and indication is made (at block 736) in the track access list 400 that cache resources are not held for the target track, in cache resources held flag 404, and that the target track was written, in the track written flag 406. The cache manager 142 accesses (at block 738) cache resources for a track following the last track for which cache resources were accessed, which may comprise the track within the establish range of tracks 302 following the prefetch cursor 304 for which the track access list 400 indicates that cache resources are not held 404 and was not written 406. Indication is made (at block 740) in the track access list 400 for the track for which cache resources were accessed that the cache resources are held, such as in field 404.

If (at block 722) the target track is not pointed to by the prefetch cursor 304, then the prefetch cursor 304 is not adjusted because a track in the establish range of tracks 302 has been written out of order and control proceeds to blocks 734-740 to release cache resources for the target track and access cache resources for a further track in the range of tracks 302.

With respect to FIG. 7a, if (at block 702) the prefetch cursor 304 points to a track within the define extent range 502, then the write request 500 is within the current sub range of the prefetch cursor 304 for which cache resources have been accessed, which means that cache resources are available for the target track, and control proceeds to block 742 in FIG. 7c. At block 742, the cache manager 142 processes a first write transaction 504 for the write request 500 using the cache resources held for the target track. From block 742, the cache manager 142 performs operations 744 and 746 in parallel. If (at block 744) there are further write transactions 504 in the write request 500, then the next write transaction 504 in the write request 500 is processed (at block 746) and control proceeds back to blocks 744 and 748 to process the next write transaction. If there are no further write transactions, then control ends. At block 748, the cache manager 142 calls a move cursor track task to move the prefetch cursor 304 for the written track by proceeding to block 722 in FIG. 7b.

With the embodiment of operations for FIGS. 7a, 7b, and 7c, during a fast write over the bus interface or first channel, if the cache resources are already allocated for the track to write, then the write request is allowed to proceed because the transaction can be processed very quickly with acceptable latency using the pre-allocated cache resources. However, if the cache resources have not been allocated to allow low latency processing of the write request, then the write request is failed because the transaction will not likely complete within a fast time threshold. This determination is made to avoid host delays in processing other tasks while the host processor is spinning on the thread handling the read/write request while waiting for the read/write request to complete. If the cache resources have already been pre-allocated, than there is a high likelihood the read/write can complete on the bus interface channel within the latency threshold required to avoid the host processor holding the thread for too long, which causes other I/O requests to be queued and delayed. Returning failure when the cache resources have not been pre-allocated causes the host thread waiting on the read/write request task to be deactivated and the host processor may context switch to processing other tasks, and then the read/write request is retried on the second network channel during the context switch.

Further, with described embodiments, once a write request is completed, the cache resources held for the target track may be released and the cache resources for a next track in the range of tracks may then be accessed. Further, the prefetch cursor is used to indicate a point in an establish range of tracks from which sequential writes are expected and from which cache resources are pre-allocated. To pre-allocate cache resources for tracks following the last written track after a write request is processed, the prefetch cursor is moved to the next track or to a track following one or more consecutive tracks following the track pointed to by the prefetch cursor 154 that were already written.

Figure 8:
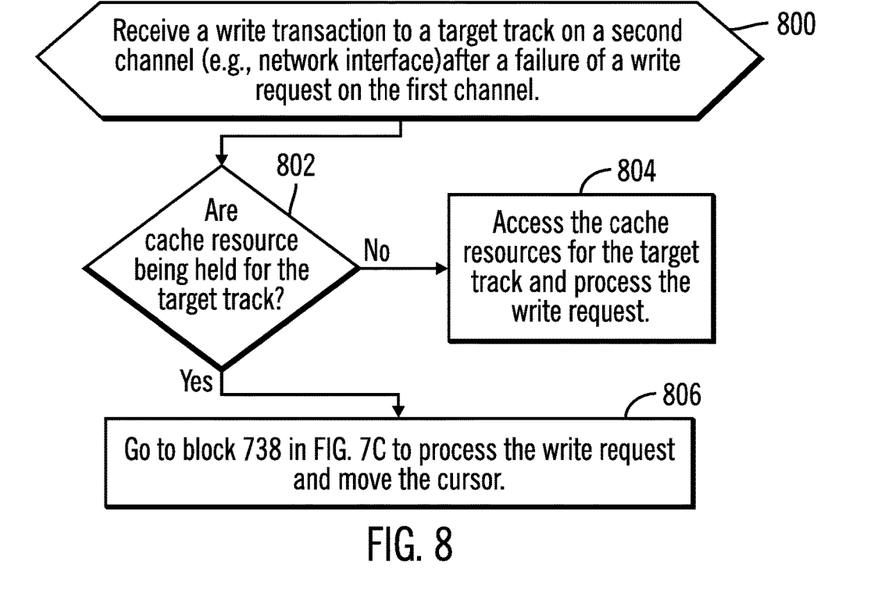
FIG. 8 illustrates an embodiment of operations to process a write request on a second slower channel from the host after failure is returned on the first channel.

FIG. 8 illustrates an embodiment of operations performed by the cache manager 142 or other component to process a write request to a target track received on a second channel, such as the network 122 on network host adaptor 134. Upon receiving (at block 800) the write request on the second channel, e.g., slower network interface, after failure is returned for a write transaction down the first channel, if (at block 802) the cache resources for the target track are not already allocated, i.e., being held, then the cache manager 142 accesses (at block 804) the necessary cache resources and performs the write request. If (at block 802) the cache resources are available, then control proceeds to block 738 in FIB. 7c to process the write request using the allocated cache resources.

With the embodiment of FIG. 8, when the write request is received on the second slower channel, such as over the network 122, where the host operating system 111 would have performed a context switch for the thread handling the read/write request, the cache manager 142 may access the cache resources for the target track. During this time, the host processing of further host requests is not delayed because the host thread handling the read/write request is context switched and not active, until the read/write request returns complete.

In described embodiments, the host operating system 100 provides the define extent range 502 as a clue to allow the storage system 102 to know the active range of tracks needed for the next sequential write requests to be received so that the storage system 102 can move the prefetch cursor to the first prefetched track needed and free all tracks prior to the cursor. The define extent range 502 may be tailored so that the beginning and ending extents specified cover only the active range. Single track writes can occur in that range. Tracks logically prior to that range may be freed. In certain implementations, application software in the host 100, such as a database program, may build the write request 500 having a chain of write transactions, and then parse the chain and determine if it is eligible for transmission on a fast first channel, such as the bus interface. All of the write requests 500, having chains of write transactions, to that range would have the same extent data to define the active set to write.

With the described embodiments, the storage system 102 would understand that sequential write transactions are anticipated within the define extent range. Thus, if an extent range was tracks N through N+x, the beginning extent would be set to N and the ending extent would be set to N+x. Every access to any track in the range N through N+x would have the same extent range. As each track completes, the track can be freed and new resources obtained. The host software may not issue write 10 to different ranges until the current range completes.

Thus, the control unit can manage the active set of tracks effectively and release any older tracks that are no longer needed if the cursor or active set is not at the beginning of tracks already obtained.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
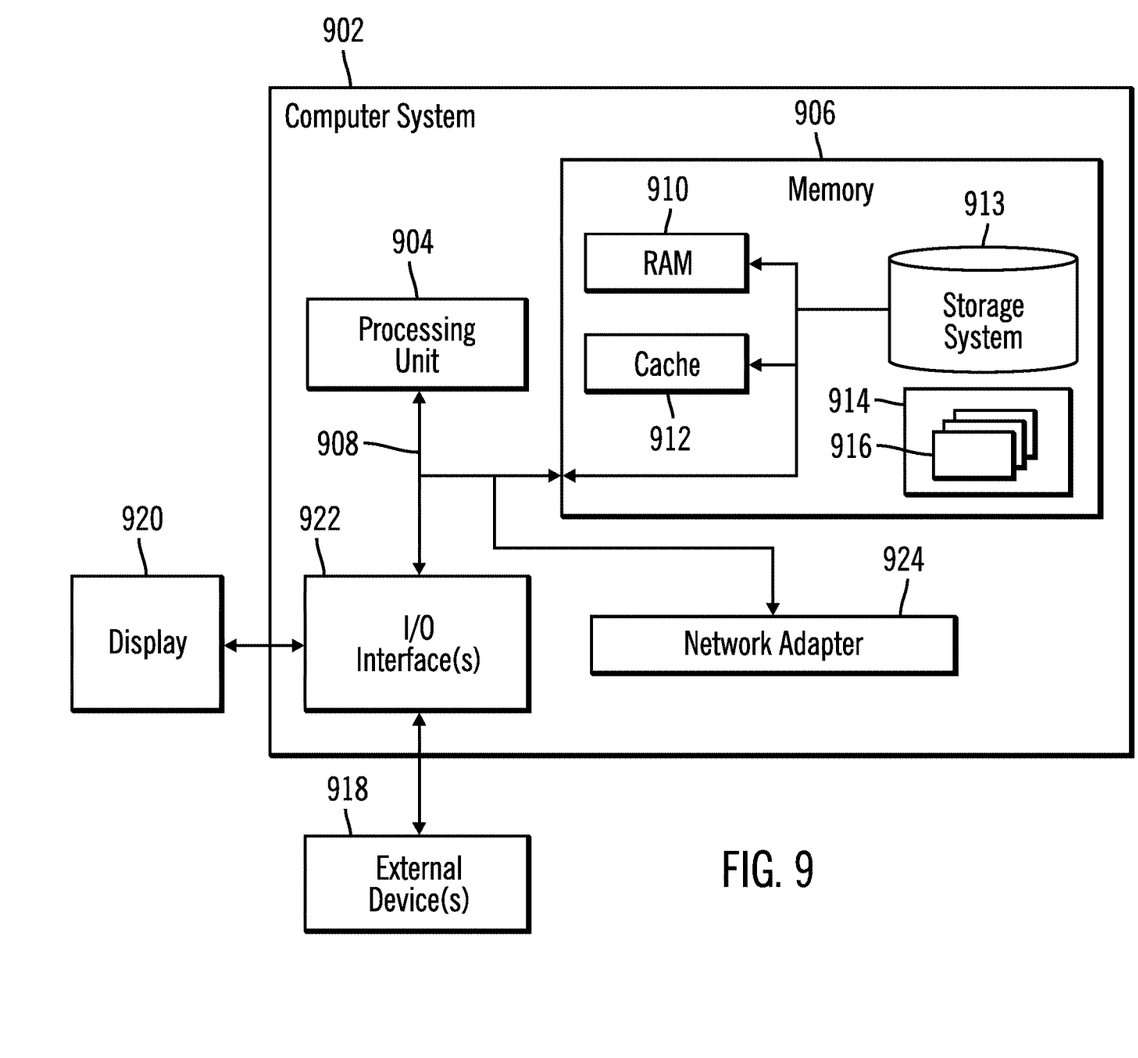
FIG. 9 illustrates an embodiment of a computer architecture used with described embodiments.

The computational components of FIG. 1, including the host 100 and storage system 102 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing access requests from a host to tracks in storage cached in a cache, the computer program product comprising a computer readable storage medium having computer readable program code embodied therein that is executable to perform operations, the operations comprising:
   accessing cache resources for the cache for tracks in a range of tracks in advance of processing write requests to the range of tracks;
   processing a write request of the write requests to a target track indicating a subset of tracks of the range of tracks;
   determining whether there is indication that cache resources have been allocated for the subset of tracks; and
   accessing the cache resources for tracks in the subset of tracks in anticipation of the write request to the subset of tracks in response to determining that there is the indication that the cache resources have been allocated for the subset of tracks.

2. The computer program product of claim 1, wherein the operations further comprise:
   determining whether there are cache resources available for the write request to the target track in response to determining that there is the indication that the cache resources have been allocated for the subset of tracks; and returning fail to the write request to the target track in response to determining that there are no cache resources available.

3. The computer program product of claim 1, wherein the operations further comprise:

in response to determining that there are cache resources available, performing:
releasing cache resources held for tracks in the range of tracks prior to the subset of tracks; and
accessing cache resources for the subset of tracks.

4. The computer program product of claim 1, wherein the operations further comprise:

processing a write for the write request to the target track using available cache resources in parallel with accessing cache resources for the subset of tracks.

5. The computer program product of claim 4, wherein the operations further comprise:

indicating to pre-allocate cache resources for a track following a written track written by the write that was not written;
releasing cache resources held for the target track; and
accessing cache resources for a track following the written track in the range of tracks for which cache resources are not held and that has not been written since the range of tracks was established.

6. The computer program product of claim 5, wherein the operations further comprise:

providing a track access list indicating for each track in the range of tracks whether cache resources are held for the track and whether the track was written since the range of tracks was established;
wherein the indicating to pre-allocate cache resources for the track following the written track:
determining from the track access list whether there are one or more consecutive tracks following the target track that are indicated in the track access list as having been written;
indicating to pre-allocate cache resources from a next track immediately following the target track in response to determining that there are not one or more consecutive tracks following the target track that have been written; and
indicating to pre-allocate cache resources from a track following a last of the determined one or more consecutive tracks in response to determining that there are one or more consecutive tracks following the target track having been written.

7. The computer program product of claim 1, wherein the operations further comprise:

accessing cache resources for a track following a last track for which cache resources were accessed in response to determining that there is the indication that the cache resources have been allocated for the subset of tracks.

8. The computer program product of claim 1, wherein the determining whether there is the indication that the cache resources have been allocated comprises determining at least one of:

that a prefetch cursor points to a track within the range of tracks of the write request; and
that the range of tracks of the write request is for a range of tracks for which cache resources have recently been accessed.

9. A system for managing access requests from a host to tracks in storage; comprising:

a processor;
a cache; and
a computer readable storage medium having computer readable program code embodied therein that is executable to perform operations, the operations comprising:
accessing cache resources for the cache for tracks in a range of tracks in advance of processing write requests to the range of tracks;
processing a write request of the write requests to a target track indicating a subset of tracks of the range of tracks;
determining whether there is indication that cache resources have been allocated for the subset of tracks; and
accessing the cache resources for tracks in the subset of tracks in anticipation of the write request to the subset of tracks in response to determining that that there is the indication that the cache have been allocated for the subset of tracks.

10. The system of claim 9, wherein the operations further comprise:

determining whether there are cache resources available for the write request to the target track in response to determining that there is the indication that the cache resources have been allocated for the subset of tracks; and
returning fail to the write request to the target track in response to determining that there are no cache resources available.

11. The system of claim 9, wherein the operations further comprise:

in response to determining that there are cache resources available, performing:
releasing cache resources held for tracks in the range of tracks prior to the subset of tracks; and
accessing cache resources for the subset of tracks.

12. The system of claim 9, wherein the operations further comprise:

processing a write for the write request to the target track using available cache resources in parallel with accessing cache resources for the subset of tracks.

13. The system of claim 12, wherein the operations further comprise:

indicating to pre-allocate cache resources for a track following a written track written by the write that was not written;
releasing cache resources held for the target track; and
accessing cache resources for a track following the written track in the range of tracks for which cache resources are not held and that has not been written since the range of tracks was established.

14. The system of claim 13, wherein the operations further comprise:

providing a track access list indicating for each track in the range of tracks whether cache resources are held for the track and whether the track was written since the range of tracks was established;
wherein the indicating to pre-allocate cache resources for the track following the written track:
determining from the track access list whether there are one or more consecutive tracks following the target track that are indicated in the track access list as having been written;
indicating to pre-allocate cache resources from a next track immediately following the target track in response to determining that there are not one or more consecutive tracks following the target track that have been written; and indicating to pre-allocate cache resources from a track following a last of the determined one or more consecutive tracks in response to determining that there are one or more consecutive tracks following the target track having been written.

15. The system of claim 9, wherein the operations further comprise:

accessing cache resources for a track following a last track for which cache resources were accessed in response to determining that that there is the indication that the cache resources have been allocated for the subset of tracks.

16. A method for managing access requests from a host to tracks in storage cached in a cache, comprising:

accessing cache resources for the cache for tracks in a range of tracks in advance of processing write requests to the range of tracks;

processing a write request of the write requests to a target track indicating a subset of tracks of the range of tracks;

determining whether there is indication that cache resources have been allocated for the subset of tracks; and accessing the cache resources for tracks in the subset of tracks in anticipation of the write request to the subset of tracks in response to determining that there is indication that the cache resources have been allocated for the subset of tracks.

17. The method of claim 16, further comprising:

determining whether there are cache resources available for the write request to the target track in response to determining that there is the indication that the cache resources have been allocated for the subset of tracks; and returning fail to the write request to the target track in response to determining that there are no cache resources available.

18. The method of claim 16, further comprising:

in response to determining that there are cache resources available, performing:

releasing cache resources held for tracks in the range of tracks prior to the subset of tracks; and accessing cache resources for the subset of tracks.

19. The method of claim 16, further comprising:

processing a write for the write request to the target track using available cache resources in parallel with accessing cache resources for the subset of tracks.

20. The method of claim 19, further comprising:

indicating to pre-allocate cache resources for a track following a written track written by the write that was not written;

releasing cache resources held for the target track; and accessing cache resources for a track following the written track in the range of tracks for which cache resources are not held and that has not been written since the range of tracks was established.

21. The method of claim 20, further comprising:

providing a track access list indicating for each track in the range of tracks whether cache resources are held for the track and whether the track was written since the range of tracks was established;

wherein the indicating to pre-allocate cache resources for the track following the written track:

determining from the track access list whether there are one or more consecutive tracks following the target track that are indicated in the track access list as having been written;

indicating to pre-allocate cache resources from a next track immediately following the target track in response to determining that there are not one or more consecutive tracks following the target track that have been written; and indicating to pre-allocate cache resources from a track following a last of the determined one or more consecutive tracks in response to determining that there are one or more consecutive tracks following the target track having been written.

22. The method of claim 16, further comprising:

accessing cache resources for a track following a last track for which cache resources were accessed in response to determining that there is the indication that the cache resources have been allocated for the subset of tracks.

* * * * *